(12) United States Patent
Rich

(10) Patent No.: US 8,860,954 B2
(45) Date of Patent: Oct. 14, 2014

(54) PHYSICAL PROPERTY MEASUREMENT DEVICE

(75) Inventor: Helen Elizabeth Rich, Gloucester (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 507 days.

(21) Appl. No.: 11/542,802

(22) Filed: Oct. 4, 2006

(65) Prior Publication Data

US 2008/0084568 A1    Apr. 10, 2008

(51) Int. Cl.
  *G01B 11/24*    (2006.01)
  *G01B 11/12*    (2006.01)

(52) U.S. Cl.
  CPC ............. *G01B 11/12* (2013.01); *G01B 11/24* (2013.01)
  USPC ............................ 356/622; 354/623; 354/626

(58) Field of Classification Search
  USPC ........................................... 356/241.1–241.6
  See application file for complete search history.

(56) References Cited

U.S. PATENT DOCUMENTS

| 4,440,496 | A | | 4/1984 | Milana |
| 4,967,092 | A | | 10/1990 | Fraignier |
| 5,280,436 | A | * | 1/1994 | Kubota et al. ................. 700/302 |
| 5,594,548 | A | | 1/1997 | Kobayashi et al. |
| 5,781,297 | A | | 7/1998 | Castore |
| 6,249,007 | B1 | | 6/2001 | Gooch et al. |
| 6,289,600 | B1 | | 9/2001 | Watts |
| 6,778,284 | B2 | * | 8/2004 | Casagrande ................... 356/614 |
| 7,116,839 | B2 | * | 10/2006 | Leboeuf ........................ 382/286 |
| 2003/0201409 | A1 | | 10/2003 | Schlenkert |
| 2004/0090635 | A1 | * | 5/2004 | Franz et al. .................... 356/498 |
| 2004/0114793 | A1 | * | 6/2004 | Bondurant et al. ........... 382/141 |
| 2005/0248774 | A1 | * | 11/2005 | Herrmann et al. ............. 356/601 |

FOREIGN PATENT DOCUMENTS

WO    WO 99/15853    4/1999

* cited by examiner

*Primary Examiner* — Tarifur Chowdhury
*Assistant Examiner* — Rebecca C Bryant
(74) *Attorney, Agent, or Firm* — Kimberly Ballew; Mark D. Shelley, II

(57) ABSTRACT

A measurement device comprises a carrier 20 adapted to be supported, in use, at least partially within a tubular body, a laser metrology unit 28 including means mounted on the carrier 20 whereby a laser beam 32 can be transmitted radially from the carrier 20 and whereby reflected light can be received, the carrier 20 being movable relative to the tubular body to adjust the position of the said means relative to the body, and a scale arrangement whereby the position of the carrier can be determined.

9 Claims, 2 Drawing Sheets

PHYSICAL PROPERTY MEASUREMENT DEVICE

This invention relates to a measurement device intended for use in measuring, sensing or determining the internal shape of, for example, an externally bounded body.

Hydraulically powered motors, for example the drilling fluid or mud powered motors used downhole in the drilling of boreholes, typically include a stator component of hollow tubular form within which a rotor is located, in use, the motor being arranged such that the application of fluid under pressure to the motor drives the rotor for rotation relative to the stator. The interior of the stator, or a lining located therein, and the outer surface of the rotor are shaped to co-operate with one another in such a manner as to define a series of isolated chambers therebetween, the axial positions of which change as the rotor rotates relative to the stator. To achieve this, the stator typically includes an elastomeric lining in which a series of helical grooves are formed.

Similar devices can be used as pumps, rotation of the rotor, for example by the use of a motor, causing fluid to be pumped through the device.

It is desirable to be able to accurately measure the internal shape of the stator. For example, during manufacture such measurement may be used to ensure that the stator is correctly shaped, and that the associated rotor will fit properly therein. During maintenance and servicing, such measurement may be used to monitor whether the stator is still serviceable, or whether it has been damaged or become worn to an unacceptable degree.

One technique for taking such measurements involves using an instrument including radially movable pads. The instrument is introduced into the stator and the pads moved towards an extended position. By measuring how far the pads move before they come into contact with the inner surface of the stator, the minor diameter of the stator can be measured. This technique is of limited application in that it is difficult to take sufficient measurements with good accuracy to build up a map or profile of the shape of the interior of the stator. Other techniques involve using cameras or the like to view the interior of the stator.

According to the present invention there is provided a measurement device comprising a carrier adapted to be supported, in use, relative to a body, a laser metrology unit including means mounted on the carrier whereby a laser beam can be transmitted from the carrier towards a surface of the body and whereby reflected light from the surface can be received, the carrier being movable relative to the body to adjust the position of the said means relative to the body, and an arrangement whereby the position of the carrier can be determined.

It will be appreciated that by using the device, a series of distance measurements can be taken with the carrier in different positions, for example different axial and/or angular positions, thereby allowing a map or profile of the surface of the body to be derived. Where used with an externally bounded or hollow body, it will be appreciated that the invention permits a map or profile of the internal shape of the body to be derived. However, it will be appreciated that the device could be used in other applications.

Conveniently, the laser metrology unit is adapted to transmit a laser beam substantially along a longitudinal axis of the body, the said means comprising a mirror or reflector carried by the carrier whereby the laser beam is reflected through approximately 90° so as to be transmitted generally radially towards the surface. The laser beam may be transmitted from a laser device also carried by the carrier. Alternatively, it may be transmitted from a laser device located at a fixed position, for example outside of the body. Although preferably arranged to transmit the laser beam substantially along the longitudinal axis of the body, it will be appreciated that the laser beam may be transmitted along a path offset from and/or angled to the longitudinal axis. Likewise, the laser beam may be reflected through an angle other than 90°.

Where the body is of relatively large diameter, it may be possible to locate the laser device to emit the laser beam generally radially thereby avoiding the use of a mirror or reflector.

The carrier may be movable in the axial direction of the body. It may additionally or alternatively be angularly movable. The arrangement for determining the position of the carrier may be configured to sense or allow measurement of the axial and/or angular position of the carrier.

Where the laser beam is transmitted by a laser device carried by the carrier, the laser device maybe movably mounted upon the carrier, measurement means conveniently being provided to allow the position of the laser device on the carrier to be sensed.

The carrier may be movably secured to a mounting arranged, in use, to remain in a fixed position, the arrangement for determining the position of the carrier being arranged to sense the position of the carrier relative to the mounting.

Alternatively, the carrier may comprise a buggy movable along the surface, the buggy incorporating means for sensing the position and/or orientation thereof. For example, the buggy may include at least one wheel, the rotation of which is monitored to determine the axial position of the buggy. The buggy conveniently incorporates a mirror or reflector and a gimball arrangement such that the action of gravity can be used to provide an indication of the orientation of the mirror or reflector.

The externally bounded body may comprise the stator of, for example, a hydraulically driven motor or a pump, but it will be appreciated that the invention could be used in a range of other applications.

The invention will further be described, by way of example, with reference to the accompanying drawings, in which.

Figure 3:
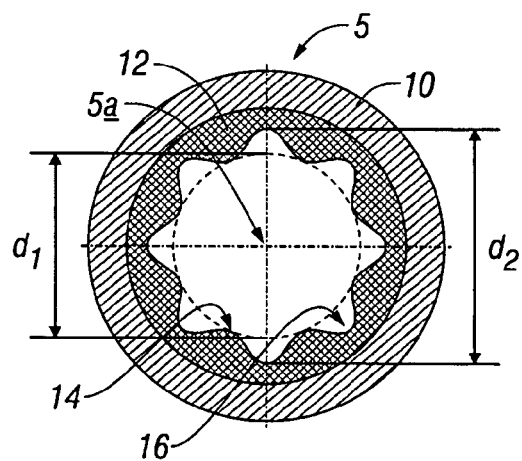
FIG. 3 is a diagrammatic sectional view illustrating part of the stator of a downhole fluid powered motor.

Referring firstly to FIG. 3 there is illustrated a section through a typical stator of a downhole drilling fluid or mud powered motor. The stator 5 comprises a tubular housing 10 of generally cylindrical form within which is provided an elastomeric lining 12. The elastomeric lining 12 is formed with a series of helical grooves 16 between which are formed lobes 14. In FIG. 3, distance $d_1$ is a minor diameter of the interior of the stator 5, the minor diameter being the distance between the peaks of diametrically opposite ones of the lobes 14. Distance $d_2$ is a major diameter of the interior of the stator and comprises the distance between diametrically opposite ones of the helical grooves 16 in the plane illustrated in FIG. 3.

Figure 1:
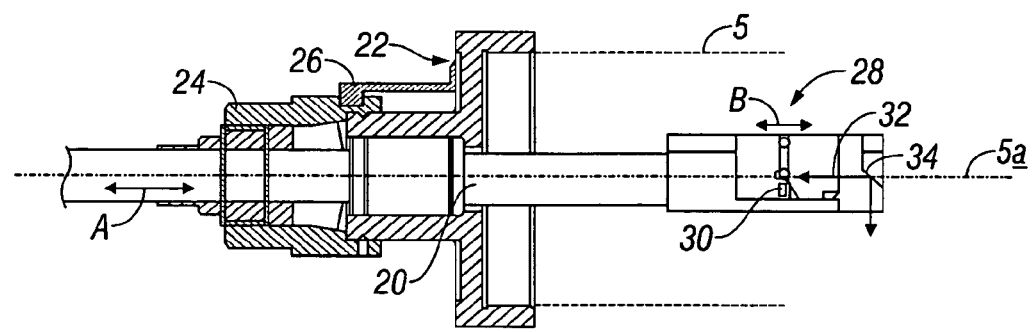
FIG. 1 is a diagrammatic view illustrating a device in accordance with one embodiment of the invention.

FIG. 1 illustrates a device in accordance with one embodiment of the invention for use in taking measurements to allow a map or profile of the interior shape of a stator to be determined. As illustrated in FIG. 1, the device comprises a carrier arm 20 supported by a mounting or support arrangement 22 arranged to fit onto an end of the stator 5 to support the carrier arm 20 such that the carrier arm 20 extends generally along the central, longitudinal axis 5a of the stator 5. The nature of the support arrangement 22 is such that the carrier arm 20 can be moved in its longitudinal direction as indicated by arrow A. The carrier arm 20 is provided with a scale (not shown) whereby the axial position of the carrier arm 20 relative to the support arrangement 22 can be measured.

A sleeve 24 is coupled to the carrier arm 20 so as to be angularly movable therewith, a pointer 26 carried by the sleeve 24 co-operating with a protractor marking provided on the support arrangement 22 to allow measurement of the angular position of the sleeve 24, and hence of the carrier arm 20.

The carrier arm 20 carries a laser metrology unit 28 including a laser device 30 arranged to transmit a laser beam 32. The laser beam may be transmitted substantially along the axis 5a, or be displaced or angled thereto. The laser metrology unit further incorporates a mirror or reflector 34 angled to the axis of the carrier arm 20, in this example, at an angle of approximately 45° such that the laser beam is reflected through an angle of approximately 90° the reflected laser beam being transmitted generally radially relative to the axis of the carrier arm 20 and being incident upon the inner surface of the stator 5. The precise orientation of the reflector 34 can be different from that mentioned above, as explained below. Light reflected from the inner surface of the stator 5 is sensed and used by the laser metrology unit to provide an indication of the distance of the inner surface of the part of the stator 5 from which light is reflected from the axis of the carrier arm 20. The distance data so determined, in combination with data indicative of the angular and/or axial position of the laser device 30 can be used in compiling data, a map or profile relating to the shape of the inner surface of the stator 5. Typically, the laser metrology unit 28 will calculate the distance of the relevant part of the inner surface of the stator 5 relative to the axis of the carrier arm 20 by sensing the reflected light. However, this need not always be the case, and other techniques could be used.

The laser device 30 of the laser metrology unit 28 may be fixed so as to be stationary relative to the carrier arm 20. However, particularly where the stator 5 is of relatively small dimensions, it is thought that it may be desirable for the laser device 30 to be movably mounted upon the carrier arm 20 as indicated by arrow B to accommodate the laser stand-off, i.e the minimum distance over which the laser device 30 is capable of sensing. Where the laser device is movably mounted, then a scale or position sensor or other suitable means are conveniently provided to permit measurement of the position of the laser device 30 relative to the carrier arm 20.

Figure 2:
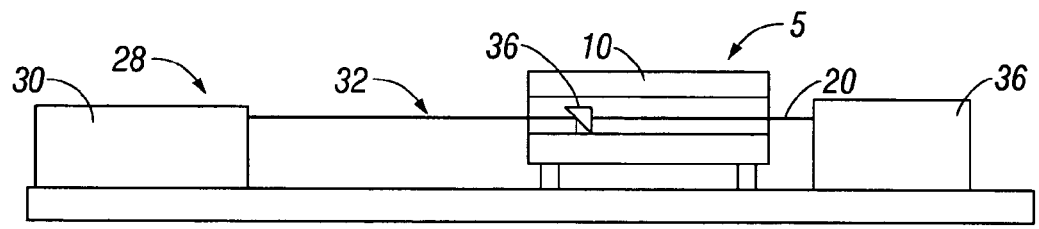
FIG. 2 is a diagrammatic view illustrating an alternative embodiment.

FIG. 2 illustrates an alternative arrangement similar, in many respects, to that of FIG. 1 but in which the laser device 30 of the laser metrology unit 28 is located externally of the stator 5, rather than internally as in FIG. 1, the laser device 30 being arranged to transmit a laser beam 32 generally in the direction of the axis 5a of the stator 5. In this arrangement, a mirror or reflector 34 carried by a carrier arm 30 is arranged to reflect the laser beam 32 so that the laser beam 32 is incident, generally radially, upon the interior surface of the stator 10 in much the same manner as the arrangement illustrated in FIG. 1. As with the arrangement of FIG. 1, by sensing the axial and/or angular position of the mirror 34 which can, in turn, be sensed by monitoring the position of the carrier arm 20, readings which can be used to build up a map or profile of the interior shape of the stator 10 can be taken. As with the arrangement of FIG. 1, the laser beam 32 may be displaced from or angled to the axis 5a of the stator.

In the arrangement illustrated in FIG. 2, a gear box and encoder arrangement 36 is used to move the carrier arm 20 and to determine the position of the carrier arm 20 and mirror 34. Consequently, it will be appreciated that the position of the carrier arm 20 and mirror 34 may be sensed and processed in an automatic manner rather than requiring the manual input of data readings taken visually from a ruler or scale. It will be appreciated that such automation may be achieved in a range of ways.

In the arrangements described hereinbefore, the angular position of the carrier arm 20 is adjustable and sensed using, for example, the pointer 26 and protractor scale. It may be desirable to provide a mechanism whereby the carrier arm 20 is only capable of occupying a series of predetermined angular positions. For example, the carrier arm may be provided with a series of grooves, a projection provided on the support arrangement engaging in a selected one of the grooves to hold the carrier arm 20 against rotation. After the required number of readings have been taken with the arm 20 in one angular position, the carrier arm 20 may be withdrawn from the relevant part of the support arrangement 22, the angle thereof adjusted, and the carrier arm 20 re-introduced to allow another series of readings to be taken with the carrier arm 20 held at a different selected angular position.

It will be appreciated that, by noting when the profile of the inner surface of the stator 5, in the axial direction, starts to repeat, and when the number of lobes 14 in a single plane of the stator 5 is known, the pitch of the helical grooves formed in the elastomer 12 can be determined.

In the arrangements of FIGS. 1 and 2 it will be appreciated that the mirror or reflector 34 mounted upon the carrier constitutes the means for transmitting the laser beam towards the surface of the body, the mirror or reflector 34 achieving this by appropriately reflecting a laser beam incident thereon and emitted from a laser device which may be located on the carrier, or at a fixed location.

Figure 4:
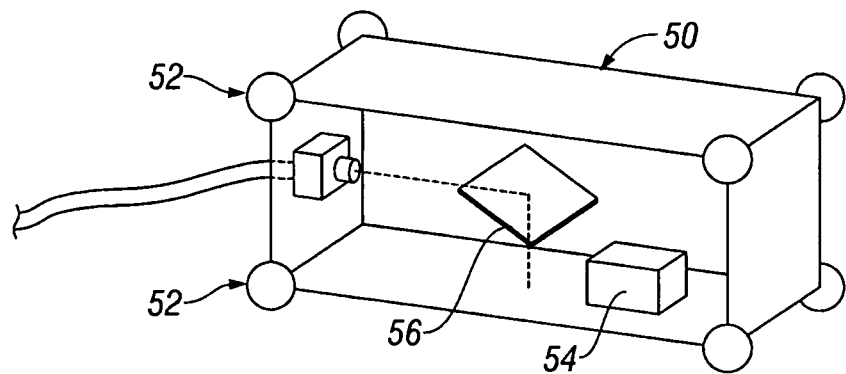
FIG. 4 is a diagrammatic view illustrating another embodiment.

FIG. 4 illustrates an embodiment in which, rather than sensing the position of the carrier relative to, for example, a fixing mounting or support arrangement 22, the carrier comprises a wheeled buggy 50 arranged to be driven over the surface to be studied, for example by one or more electric motors driving at least some of the wheels 52 of the buggy 50. The buggy 50 carries a gimball arrangement 54 which permits the angular orientation of the buggy 50 to be sensed, and carries a mirror, reflector or prism 56. A sensor is arranged to monitor rotation of at least one of the wheels 52 and thereby provide an output representative of the axial position of the buggy 50. In use, a laser beam incident upon the reflector 56 is transmitted generally radially so as to be incident upon the surface, and reflected light is sensed to provide a distance reading which, as mentioned hereinbefore, can be used to formulate a map or profile of the surface. The laser beam may be transmitted either from a laser device carried by the buggy or from an external location.

The buggy 50 may, conveniently, be designed so that each wheel 52 thereof rides along a respective one of the grooves 16, but this need not always be the case.

Figure 5:
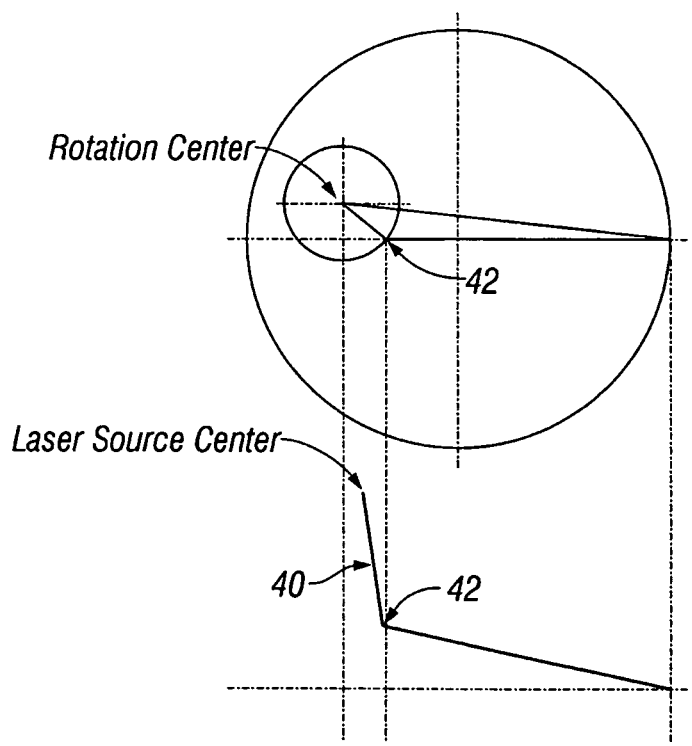
FIG. 5 is a diagram explaining the operation of a device in accordance with another embodiment of the invention.

FIG. 5 illustrates an arrangement in which the laser beam is transmitted in a direction offset from and angled to the axis of the carrier and the body. The upper part of FIG. 5 shows the path of the reflected laser beam as viewed from an end of the body, the lower part of FIG. 5 showing the path in a section taken along the axis of the body. As shown in the lower part of FIG. 5, the laser beam 40 is transmitted along a path displaced from the axis of the body and angled thereto at an angle q. A mirror located at point 42 reflects the laser beam 40 towards the surface of the body, the laser beam 40 being incident on the surface at an angle t.

The actual distance, s, from the axis of the carrier to the part of the surface of the body from which the beam is reflected can be calculated from the formula:

$$s^2 = r^2 + (R-h)^2 \cos^2(t) - 2r(R-h)\cos(t)\cos(p)$$

where r, h, t and p are the distances and angles identified in FIG. 5 and R is the sensed distance from the laser source to the surface of the body (ie R=h+g).

As r, h, t and p are constants, s can be expressed in the forms:

$$s^2 = AR^2 + BR + K$$

$$s^2 = a(R-b)(R-k)$$

where A, B, K, a, b and k are constants. If three known distances can be sensed, then the values of these constants can be determined. This may be difficult to achieve in practise, and so it may be preferred to measure three bore diameters and to use these to determine appropriate values for the constants.

It will be appreciated that, by operating the device in this manner, situations where the laser beam is not transmitted precisely along the axis of the body, but is transmitted in a fixed direction, can be accommodated. Similarly, situations where the mirror is not aligned to reflect the laser beam truly radially can also be accommodated.

It will be appreciated that a large number of modifications and alterations may be made to the arrangements described hereinbefore without departing from the scope of the invention.

What is claimed is:

1. A measurement device comprising:
   a stator support arrangement;
   a carrier adapted to be supported, in use, on the end of a stator by the stator support arrangement which holds the carrier along a central longitudinal axis of the stator when the stator support arrangement is engaged with the stator;
   a laser metrology unit including a laser device, a minor or reflector, and mounting means for mounting said laser metrology unit on the carrier, said laser metrology unit transmitting a laser beam from the carrier towards an interior surface of the stator, the laser beam being reflected by the interior surface of the stator, and whereby said reflected laser beam is received by the laser metrology unit;
   the laser metrology unit being mounted so as to move in an axial direction relative to the carrier,
   the carrier being movable relative to the stator support arrangement and the stator when the stator support arrangement is engaged with the stator, and
   an arrangement whereby the position of the carrier is determined.

2. A device according to claim 1, wherein the laser beam is reflected by the minor or reflector as to be transmitted generally radially towards the interior surface of the stator.

3. A device according to claim 2, wherein the laser beam is transmitted from a laser device carried by the carrier.

4. A device according to claim 3, further comprising measurement means, wherein said measurement means allows the position of the laser device on the carrier to be sensed.

5. A device according to claim 1, wherein the carrier is movable in the axial direction of the stator.

6. A device according to claim 1, wherein the carrier is angularly movable.

7. A device according to claim 1, wherein the arrangement whereby the position of the carrier is determined, is configured to sense or allow measurement of the axial and/or angular position of the carrier.

8. A device according to claim 1, wherein the arrangement whereby the position of the carrier is determined senses the position of the carrier relative to the stator support arrangement.

9. A device according to claim 1, wherein the carrier comprises a movable buggy.

\* \* \* \* \*